July 21, 1931.  L. O. BOUCHARD  1,815,610
DECORATIVE WREATH
Filed Dec. 4, 1929
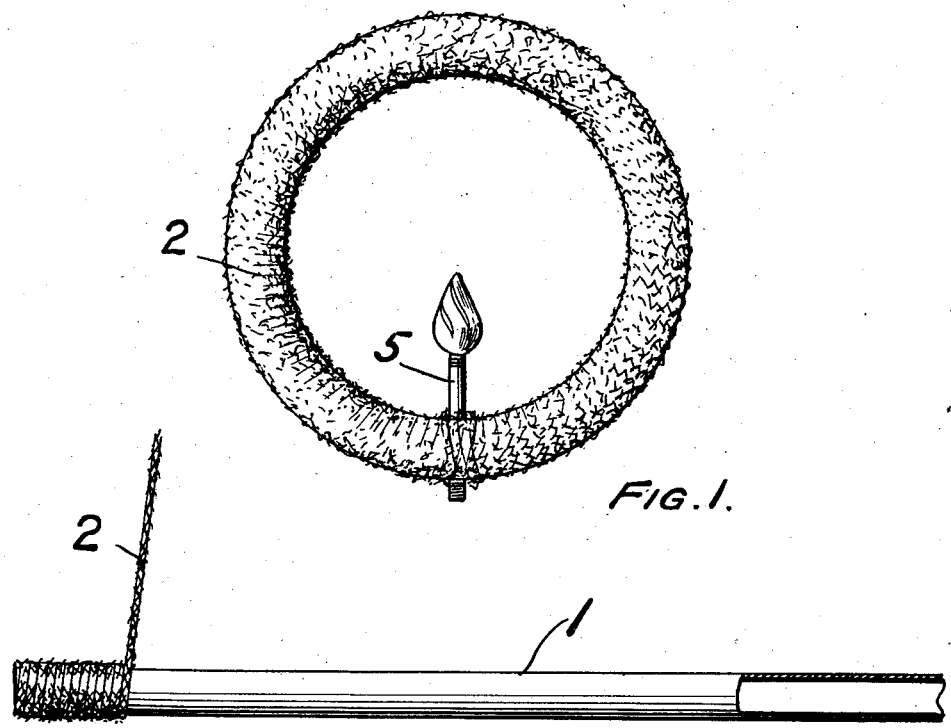
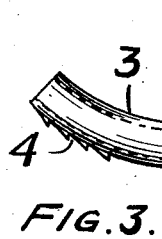
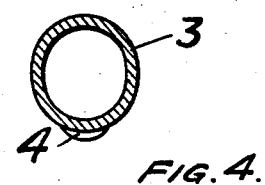
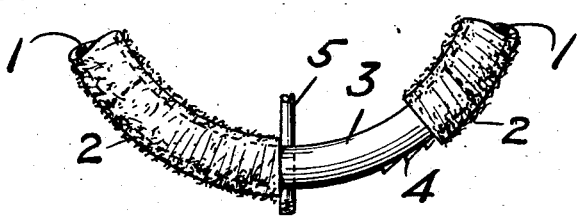
WITNESS:
Rob R Kitchel
INVENTOR
Louis Orrill Bouchard
BY
Augustus B. Stoughton
ATTORNEY Patented July 21, 1931

1,815,610

UNITED STATES PATENT OFFICE

LOUIS ORRILL BOUCHARD, OF PHILADELPHIA, PENNSYLVANIA, ASSIGNOR, BY DIRECT AND MESNE ASSIGNMENTS, OF TWO-THIRDS TO C. GWYNNE DOUGLAS, INC., A CORPORATION OF PENNSYLVANIA, AND ONE-THIRD TO PAPER NOVELTY CORPORATION, A CORPORATION OF PENNSYLVANIA

DECORATIVE WREATH

Application filed December 4, 1929. Serial No. 411,433.

The principal object of the present invention is to provide a comparatively inexpensive and very sightly and attractive decorative wreath which can be readily wound, stored and shipped in straight line position, and which can be conveniently turned and arranged in wreath or circular form.

To this and other ends hereinafter set forth the invention, generally stated, consists in a hollow tube which may well be of flexible and elastic material, and which, while straight, is wound or wrapped with decorative material, and can then be shipped or stored, and which for use after having been brought to wreath form, is retained in that form by inserting into the openings in its adjacent rows, an arcuate coupling member.

The invention also comprises the improvements to be presently described and finally claimed.

The accompanying drawings will be referred to in the following description and in it Figure 1 is a view of a wreath embodying features of the invention and showing a lamp which may or may not be provided, as desired.

Fig. 2 is a view showing the tube in straight position being wrapped with decorative material.

Fig. 3 is a side view of one form of coupling that may be employed.

Fig. 4 is a cross section taken on the line 4—4 of Fig. 3, and

Fig. 5 is a view illustrating the application of the coupling.

In the drawings 1 is a tube of elastic or flexible material which can be obtained very cheaply and of proper sizes for making good looking wreaths. 2 is decorative material wound or wrapped on the tube 1. The decorative material may, for illustration, be of chenille-like character and may consist of paper or other fabric. It is an advantage and economy in manufacture that a piece of straight tube can be rotated, for example by placing it on a rotating arbor, and the chenille can be fed onto the rotating tube as by a suitable traversing guide. The wrapped tubes can be kept in stock or shipped in straight condition which is obviously advantageous.

When it is desired to use the wreaths, the tube 1 is bent to circular form and a coupling 3 is inserted into the bore of the adjacent ends of the tube, thus preserving the circular shape. The coupling may be arcuate in order to conform to the circular shape of the wreath. If desired the coupling may also be tubular and it may be somewhat flattened in cross section, Fig. 4, in order to insure its fitting tightly in the end of the tube 1, and for the same purpose the coupling may be provided with teeth 4, arranged on its face, but these provisions, in all cases, are not necessary.

It is an advantage of the described construction that the coupling may be employed to support an ornament, such as the electric lamp fixture 5.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A wreath including a continuous length of tube having a continuous decorative wrapping and adapted to assume straight line position for receiving the wrapping and to assume circular form with its two ends in confronting relation, and means for connecting the ends.

2. A wreath including a tube having a decorative wrapping and adapted to assume straight line position for receiving the wrapping and to assume circular form with its ends in confronting relation, and a coupling element having two ends each extending into one end portion of the tube.

3. A wreath including a single tube having a decorative wrapping and an arcuate coupling member extending into each end of the tube.

4. A wreath including a tube having a circular bore and provided with a decorative wrapping, and a tubular coupling member having a flattened bore and arranged in the end portions of the first mentioned tube.

5. A wreath including a tube having a decorative wrapping, and a coupling member having teeth and adapted for insertion into the end portions of the tube.

LOUIS ORRILL BOUCHARD.